United States Patent [19]

Dowling et al.

[11] 3,879,815
[45] Apr. 29, 1975

[54] CLAMP ASSEMBLY

[76] Inventors: William E. Dowling, 1813 Glen Oak La.; John E. Heckethorn, 731 Wade Hampton Rd., both of Dyersburg, Tenn. 38024

[22] Filed: Oct. 25, 1973

[21] Appl. No.: 409,731

[52] U.S. Cl. .................................... 24/277; 151/36
[51] Int. Cl. ............................................... B01j 6/00
[58] Field of Search .................. 24/277; 151/36, 38

[56] References Cited
UNITED STATES PATENTS

| | | | |
|---|---|---|---|
| 1,520,032 | 12/1924 | McCulloch | 151/36 |
| 3,605,214 | 9/1971 | Spatts et al. | 24/277 |

*Primary Examiner*—Paul R. Gilliam
*Assistant Examiner*—Doris L. Troutman
*Attorney, Agent, or Firm*—Dennison, Dennison, Townshend & Meserole

[57] ABSTRACT

The preferred embodiment of the invention is a U-bolt clamp having a saddle formed from a blank of sheet steel rolled at its ends to provide tubular portions for housing the legs of the U-bolt in axially slidable relation. A conventional nut is threaded on the free end of each bolt leg for drawing up against the adjacent end of its associated tubular portion, said end being constituted as an integral spiral cam rising in the direction of drawing up rotation of the nut. Due to the spring tension of their tubular portions, the cams serve the purpose of lock washers, thereby eliminating the need for such.

7 Claims, 5 Drawing Figures

CLAMP ASSEMBLY

CROSS REFERENCE

The application is directed to an invention related to the subject invention of copending application of William E. Dowling et al., Ser. No. 285,223, filed Aug. 31, 1972, for U-Bolt Clamp Assembly, now U.S. Pat. No. 3,772,745.

BACKGROUND

The field of the present invention is the art of clamps, particularly clamps in which a pair of work-engageable clamp members are brought to full clamped position by the drawing up rotation of a nut on the threaded stem of a bolt carried by one of the clamp members and slidable axially through a tubular portion on the other clamp member, in association with means for "locking" the nut in its final drawn up position.

The prior art relating to such clamps relies chiefly on the use of conventional split ring lock washers for holding nuts against fortuitous backing off from their fully drawn up positions. Such washers tend to open up and destroy themselves when stressed by a nut that is highly torqued. We have found that under service conditions which demand unusually high clamp tightening ability, conventional prior art nut locking devices soon break down and fail to accomplish their intended purpose. This propensity to failure is particularly characteristic of automobile muffler clamps of the saddle or U-bolt type, which require high clamping ability and which are subjected to service related shocks and vibrations tending to loosen their securing nuts. Such clamps are for the most part derived from a basic assembly comprising a sheet metal saddle member with parallel tubular portions spaced apart and connected by an integral web having a semicircular work engaging edge curved on the radius of the bight of a U-bolt that has parallel legs slidable axially in the tubular portions. The free ends of the legs are threaded for reception of securing nuts that are drawn up against lock washers interposed between the nuts and adjacent ends of the tubular portions to advance the saddle into clamping position. In the known types of such clamps, those most pertinent to the present invention utilize a saddle formed from a flat blank of thin sheet metal stamped or cut substantially as illustrated in U.S. Pat. No. 3,137,053. The tubular portions of the saddle web through which the legs of the U-bolt move are rolled so that their axially extending terminal edges are brought into contact or engagement with the web, as stated in column 3 of the above patent, lines 60–64. Furthermore, the ends of the tubular portions adjacent the lock washers and securing nuts are flush with the plane of the bottom edge of the web, so that the actual end faces of the tubular portions lie in their entirety in planes normal to the axis of said portions. We have found that in U-bolt clamps having the aforesaid structural organization, when a securing nut is torqued in a tightening operation, it fails at a torque of 16 ft. lbs. or above, and the clamp collapses. The clamping ability of prior art clamps of the types above indicated appears to be limited to a torque no higher than 16 ft. lbs.

SUMMARY OF THE INVENTION

The invention intrinsic in the specific embodiment disclosed herein is a clamp assembly capable of attaining and maintaining unusually high clamping pressure that is progressively imposed by the interaction between spring biased cam means selfcontained in a work engageable member of the clamp and tool operated separate means by which the clamp is brought to and secured in clamped service position. The prototype clamp which is the preferred embodiment of this invention has successfully held up under 40 ft. lbs. torque, using conventional medium carbon nuts for drawing up against spiral cam surfaces of a work engageable clamp member, which spiral surfaces rise in the direction of drawing up rotation of the nuts. The clamp assembly contains no lock washers, lock nuts, or any prior art nut and bolt locking devices.

DETAILED DESCRIPTION

Figure 1:
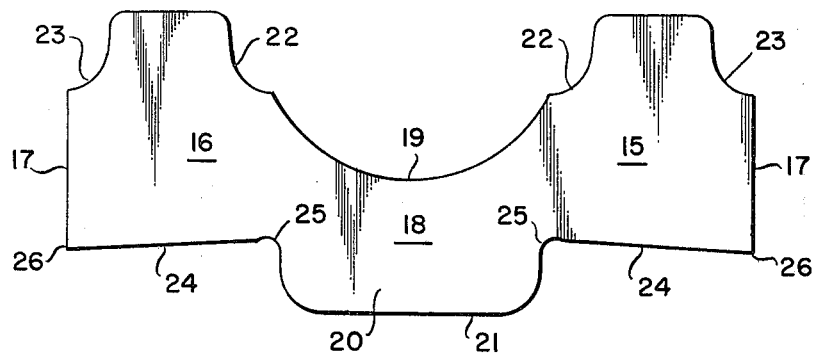
FIG. 1 is a plan view of a blank from which a work engageable member (here shown as a saddle) of the clamp assembly is formed.
Figure 2:
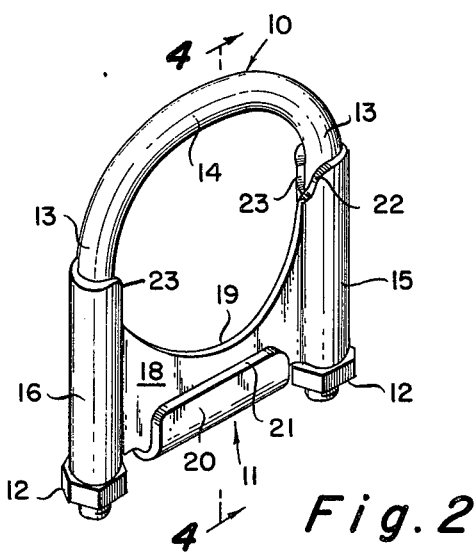
FIG. 2 is a perspective view of the assembled clamp.
Figure 3:
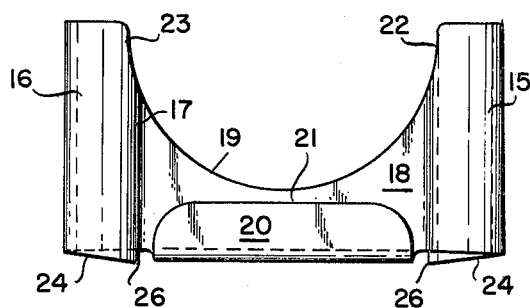
FIG. 3 is an elevation of the work engageable member as formed from the blank of FIG. 1.

The invention herein disclosed is a clamp assembly fabricated of four separate parts: a first work engageable member 10, here shown as a U-bolt; a second work engageable member 11, here shown as a saddle; and a pair of tool operated clamp securing members 12, here shown as conventional medium carbon nuts threaded on the free ends of the U-bolt legs 13 which extend in parallel relation from the semicircular bright portion 14 of the bolt. The saddle is slidable axially on the bolt legs between the securing nuts and the bight of the bolt. In operation, a coupling joint of telescoped tubular members (not shown) is compressed between the saddle and the bight portion of the bolt when the saddle is moved toward the bight under the propulsion force of the nuts as they are drawn up on the bolt legs.

A salient feature of the invention is the structure of the saddle 11. This is preferably formed from an initially planar, thin, oblong sheet steel blank of C-1045 high carbon steel austempered to $R_c$ 40–45 to provide it with a spring temper. We have found that when the blank is made from 13 gage (0.090 inch) the clamp is virtually indestructible.

The blank is stamped or cut in the outline shown in FIG. 1. It is rolled at each end to form tubular portions 15 and 16, respectively, which in cross section are open circle loops bisected by the plane of the intervening portion of the blank. The terminal ends 17 of the loops are turned inwardly toward the plane of the intervening portion 18 of the blank. The portion 18 of the blank constitutes a web that connects the tubular portions 15 and 16, and these tubular portions are trained, respectively, in the direction of drawing up rotation of their associated securing nuts.

Figure 4:
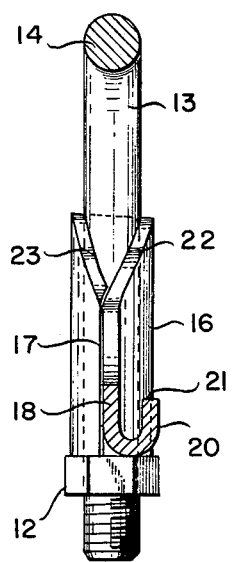
FIG. 4 is a sectional view on the line 4—4 of FIG. 2.

The web 18 is formed with a semicircular upper or work engageable edge 19 curved on the radius of the U-bolt bight 14 and complemental thereto, so that together the bight and the saddle edge 19 delineate the circumference of a circle equal in diameter to the external diameter of the outer tube of a telescoped tube joint when clamped between the U-bolt and the saddle. Longitudinal reinforcement of the web is provided by an integral flat portion 20 upturned from the bottom edge of the web with an inside radius of approximately 3/32 inch as shown in FIG. 4. The portion 20 rises parallel to the plane of the web 18 and has a straight upper edge 21 that lies in a plane normal to the axes of the tubular portions 15 and 16 and spaced a short distance below the bottom of the semicircular edge 19, preferably about 1/32 of an inch.

Those parts of the tubular end portions 15 and 16 which extend above the semicircular edge portion 19 of the saddle web have inner edges 22 and outer edges 23 curved in the configuration shown in FIG. 1, constituting divergent lips that are continuations of the semicircular edge 19 of the web and on its radius, whereby they are adapted to engage the exterior tube of a telescoped tube joint when clamped between the U-bolt and the saddle. When the securing nuts are drawn up to advance the saddle toward the bight of the U-bolt, the curved lips 22 and 23 are squeezed into engagement with the exterior surface of the outer tube and indent the tube into sealed engagement with the inner tube of the joint in the manner described in the aforesaid U.S. Pat. No. 3,137,053.

Figure 5:
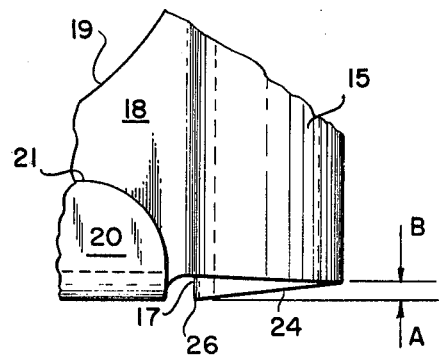
FIG. 5 is an enlarged fragmentary detail view of the lower right hand portion of FIG. 3.

A radical departure from the prior art teaching epitomized in said patent and in the aforesaid copending application of William E. Dowling et al., is the means, intrinsic in the present invention, for attaining and maintaining an unusually high clamping ability, an ability more than double the ability of the aforesaid prior art clamps, and with fewer parts. In the embodiment of the invention herein disclosed, this means comprises two components: a self-contained cam in each of the tubular portions 15 and 16 of the clamp saddle, and a conventional medium carbon nut threaded on the free end of each bolt leg for abutting engagement against the cam of its associated tubular portion. The self-contained cam is a spiral riser surface 24 on the nut engaging end face of each tubular portion rising from its point of junction 25 with the root of the reinforcement 20 and having its high point 26 coterminous with the axially extending edge 17 of its associated tubular portion, as shown in FIG. 1. When the tubular portions are rolled to final form, their cam faces 24 will rise in the direction of drawing up rotation of the particular securing nut 12 by which they are engaged in service. The cam junction points 25 lie in a plane parallel to the longitudinal axis of the web 18 and parallel also to the edge 21 of the reinforcement 20, as best seen in FIG. 5, in which said plane of the junction points is indicated by the tip of arrow B. In the relaxed position of the cams 24 their high points lie in a plane parallel to and below the plane of the junction points 25 and indicated by the tip of the arrow A. The vertical distance between these planes A and B determines the extent to which the high points of the cams are forced upwardly against their spring temper tension when their associated nuts 12 are drawn up against them. The cams eliminate the need for lock washers or self locking nuts; they not only fulfill the function of such devices, but in addition provide means for increasing the diametrical squeezing force exterted by the arcuate lips 22 at the upper ends of the tubular portions 15 and 16 to an extent far greater than the sqeezing force exerted by their counterparts in the aforesaid patent and copending application. In the clamp of the present invention the lips 22 move up correspondingly with upward movement of the cam high points 26, due to the spring temper of the metal from which the saddle 11 is made. In fact, even after the cams are fully flattened against the face of the nut as shown in FIG. 4, increased torquing of the nuts can cause the clamp to bite deeper into the tubing thereby greatly increasing the clamping ability of the clamp.

MODE OF OPERATION

As the saddle advances toward the bight of the U-bolt under the drawing up rotation of the securing nuts, it is checked by the resistance of work being compressed between the bight and the semicircular recess in the upper edge of the saddle. Continued torquing of the nuts forces the saddle into further compressive engagement with the work and at the same time forces the cam high points 26 and the arcuate lips 22 and 23 of the saddle simultaneously upward to effect the work compressing action hereinbefore described. As the nut torquing grows heavier, the cam faces on the lower ends of the tubular portions 15 and 16 flatten out in their entirety until they lie in the higher plane indicated by arrow B in FIG. 5. Due to the spring temper of the saddle blank, the upward movement of the tubular portions brings their cam faces 24 under increasing spring tension biasing them downwardly against the upward moving faces of the nuts, so that the cam faces 24 function in the manner of lock washers in frictionally resisting backing off rotation of the nuts following conclusion of their drawing up operation. In this respect they are more efficient than lock washers because they cannot shift angularly relative to their integral tubular portions. When the cams are flattened in the plane B of FIG. 5, they are in the position shown in FIG. 4, in the plane of their points of junction 25 with the roots of the saddle reinforcement 20.

Continued torquing of the nuts beyond their FIG. 4 position is possible because of the spring temper of the saddle blank. It necessitates unusually high torquing but is effective to substantially increase the clamping ability of the clamp. As the nuts are drawn up further beyond their FIG. 4 position, the tubular portions 15 and 16 are correspondingly forced to rise further on the U-bolt legs and thus increase their diametrical squeezing pressure on the work.

Although the preferred embodiment of the invention is shown and described as a saddle clamp of the U-bolt type, the invention is equally applicable to any clamp assembly in which a work engageable member is tightened in clamping arrangement with the work by nut and bolt means wherein the nut is rotated in a direction to draw it up against the work engageable member and thereby force it into clamping arrangement with the work.

We claim:

1. A clamp assembly comprising a U-bolt having a bight and a pair of legs, a pair of tubular portions slidable axially on said legs, a saddle web integral with and spanning the space between said tubular portions, and securing nuts threaded on the free ends of the bolt legs for drawing up against the adjacent ends of the tubular portions, each tubular portion having an axially extending terminal edge directed toward the adjacent face of the saddle web, and the nut-adjacent end edge face of each tubular portion being a spiral rise cam rising toward the nut in the direction of its drawing up rotation.

2. In the assembly of claim 1, each cam having a high point terminating flush with the axially extending terminal edge of its tubular portion.

3. In the assembly of claim 1, the saddle web and tubular portions being constructed of sheet metal spring tempered to bias the tubular portions resiliently against axial movement incident to drawing up rotation of the nuts.

4. A U-bolt clamp saddle comprising a planar formed blank of spring tempered sheet steel having at each end a tubular portion bisected by the plane of the blank and terminating in an axially extending free edge parallel to the adjacent face of the blank, one side edge of the blank being a work engageable clamp member, the ends of the tubular portions adjacent the opposite side edge of the blank having the configuration of cams rising spirally from their junction with said opposite edge of the blank and terminating flush with the adjacent terminal edge of their associated tubular portions.

5. In the saddle of claim 4, reinforcing means comprising a portion of the blank at said edge opposite the work engageable edge turned in the direction of the work engageable edge and in closely spaced parallel relation to the web.

6. In the saddle of claim 5, said reinforcing portion of the blank terminating in a straight edge spaced below the work engageable edge portion of the blank and in a plane normal to the axes of the tubular portions thereof.

7. A clamp for coupling a telescoped pair of cylindrical conduits in fluid leak preventing relation comprising, in combination: A U-bolt having a pair of parallel legs connected at one end by an integral semi-circular bight portion adapted to embrace the outer one of a telescoped pair of conduits when applied thereon, the other end of each leg being threaded for reception of a conventional securing nut; a saddle comprising a sheet of spring tempered steel extending transversely between the U-bolt legs and formed at each end thereof with an integral tubular portion housing and axially slidable on the adjacent bolt leg; each tubular portion having a free terminal edge parallel to the longitudinal axis of its associated bolt leg and closely adjacent a face of the saddle sheet, and each tubular portion being in cross section an open circle bisected by the plane of the longitudinal median of the saddle sheet between its bolt leg housing ends; the side edge of the saddle sheet facing the bight of the U-bolt having a semi-circular recess curved on the radius of the U-bolt bight and complemental thereto; the terminal edge of each tubular portion of the saddle sheet being constituted and arranged as an arcuate lip curved on the radius of said semi-circular recess and extending beyond the recess in the direction of the U-bolt bight; the side edge of the saddle sheet opposite its recessed edge being turned in the direction of said recess and extending parallel to the plane of the saddle sheet in closely spaced relation thereto and terminating in a straight edge spaced distally from the recessed edge of the saddle in a plane normal to the longitudinal axes of said tubular portions; the ends of said tubular portions opposite their curved lip ends being each formed as a single integral spiral cam rising from its junction with the saddle sheet to a high point coterminous and flush with said axially extending free terminal edge of the tubular portion; and a conventional securing nut on the threaded end of each U-bolt leg for drawing up against its adjacent cam, each cam rising in the direction of drawing up rotation of its associated nut, whereby, when the nuts are drawn up against their associated cams on the tubular portions, the recessed edge of the saddle will be advanced toward the U-bolt bight to its maximum clamping engagement with the outer one of a telescoped pair of cylindrical conduits when disposed between the bight of the U-bolt and the recessed side edge of the saddle sheet while at the same time said curved lips will, due to the action of the cams, be advanced axially along the legs of the U-bolt into further compressive clamping engagement with the outer one of the telescoped conduits beyond the point of maximum compression of said recessed edge of the saddle sheet against the conduit coupling clamped between it and the bight of the U-bolt.

* * * * *